United States Patent [19]
Dichter

[11] Patent Number: 6,137,903
[45] Date of Patent: *Oct. 24, 2000

[54] COLOR TRANSFORMATION SYSTEM BASED ON TARGET COLOR IMAGE

[75] Inventor: Wilhelm Dichter, Tewksbury, Mass.

[73] Assignee: Linotype-Hell AG, Kiel, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/868,484

[22] Filed: Jun. 3, 1997

[51] Int. Cl.[7] ................................................ G06K 9/00
[52] U.S. Cl. ........................ 382/162; 358/540; 382/167
[58] Field of Search ................................. 358/540, 518, 358/523, 522, 520; 382/276, 277, 162, 163, 164, 167

[56] References Cited

U.S. PATENT DOCUMENTS

4,276,570   6/1981  Burson et al. ........................ 382/276
5,416,848   5/1995  Young .................................... 382/191
5,583,665  12/1996  Gregory, Jr. et al. .................. 358/504
5,751,845   5/1998  Dorff et al. ............................ 382/162

Primary Examiner—Bhavesh Mehta
Attorney, Agent, or Firm—Hill & Simpson

[57] ABSTRACT

A method and system for color transformation of a color variation in an original image into a new color variation in a transformed image of the original image based on a representative color in a target image, the color image workstation is provided having a color computer and a video monitor. The original image and the target image are input into the color computer. A plurality of color samples are picked at points on the target image by use of the video monitor. A statistical analysis is employed to obtain the representative color of the target image. A plurality of color samples are picked at points on the original image also by use of the video monitor. A statistical analysis is employed to obtain a representative color of the original image. By use of the representative color of the original image and the color variation of the original image, and also by use of the representative color of the target image, image points of the original image are transformed to the transformed image.

13 Claims, 7 Drawing Sheets

STEP A: COLOR PICK PLURALITY OF COLOR SAMPLES FROM POINTS ON TARGET IMAGE

FIG.3B

STEP B: STATISTICAL ANALYSIS TO OBTAIN AVERAGE H S L VALUES DEFINING AVERAGE COLOR OF TARGET IMAGE:

FIG.3C

STEP C: COLOR PICK PLURALITY OF COLOR SAMPLES FROM POINTS ON ORIGINAL IMAGE:

FIG.3D

STEP D: STATISTICAL ANALYSIS TO OBTAIN AVERAGE H S L VALUES DEFINING AVERAGE COLOR OF ORIGINAL IMAGE:

FIG.3E

STEP E: FILTERING COMPOSITE ORIGINAL IMAGE TO ELIMINATE UNDESIRED COLOR VALUES IN COMPOSITE ORIGINAL IMAGE BACKGROUND SIMILAR TO COLOR VALUES IN ORIGINAL IMAGE WITH FILTERING PORTION OF SIMILARITY PROGRAM

FIG. 3F

STEP F: TRANSFORM EACH POINT ON FILTERED COMPOSITE ORIGINAL IMAGE TO CREATE COMPOSITE TRANSFORMED IMAGE:

SUB-STEP 1: IF COMPOSITE ORIGINAL IMAGE H,S,L VALUES ARE EQUAL TO AVERAGE ORIGINAL IMAGE $H_S, S_S, L_S$ VALUES

SUB-STEP 2: IF COMPOSITE ORIGINAL IMAGE H,S,L VALUES NOT ARE EQUAL TO AVERAGE ORIGINAL IMAGE $H_S$ $S_S$ $L_S$ VALUES

COLOR TRANSFORMATION SYSTEM BASED ON TARGET COLOR IMAGE

BACKGROUND OF THE INVENTION

The present invention relates to transformation of color images in color image work stations, and more particularly to the transformation of the colors of an original image into a transformed image based on colors in a target image.

It has been known previously in prior art color image work stations, such as the Linotype-Hell workstations, to pick a color from within a color image and then to color either another portion of that same image or another image with the selected color. If only a portion of an image is having its colors modified, then, for example, it has been known to employ masking techniques to surround the portion of the image whose color is to be changed and then to use the selected color to transform that portion of the image. However, frequently masking techniques are unsuitable for making color changes in portions of images.

SUMMARY OF THE INVENTION

It is an object of the invention to automatically transform images into a common color space. This produces a feeling that all images belong to the same color family. The common color space can belong to the target image or can represent some average of all images involved.

It is also an object of the invention to take an original image and to change the coloring in either all or a portion of that original image based on color in a selected portion of another image known as a target image, while also taking into account color variations in the original image.

According to the present invention, similarity algorithms are executed globally or in the selected color areas with the results smoothly dissolving into the further areas. Color areas or points are selected by a brush or a color picker (of any shape) in original and target images are used to setup the transformation. Similarity algorithms are executed simultaneously in any combination of color components (e.g. CMYK; HSL; Lab). All images involved in the similarity procedure are visible on a screen of the work station.

With the invention, the transformation is smoothly dissolved into the untouched color background regions surrounding the original color image.

The amount of color change applied at any given point is a function of:

selected color differences between colors selected from original and target images; and color distances measured in the selected color space (e.g. CMYK, HSL, Lab) between any color of the original image and its selected value. To eliminate "accidental errors" color distances can be calculated from a so-called filtered (smoothed) image, explained hereafter.

With the invention, all qualitative color relations between the original image points can be preserved.

The workstation which implements the similarity algorithms of the invention automatically and smoothly transforms the original image from its own into some other (target) color space. The target color space can belong to one image or represent some statistical average of many images involved. This creates a feeling that the new (transformed) image and the target image belong to the same color family. The images and the entire transformation can be defined in terms of any color space, which is either device dependent or device independent (e.g. CMYK; HSL; Lab).

According to the invention, a color image transformation system and method is provided for transforming a color variation in an original image into a color variation in a transformed image of the original image based on a representative color in a target image. A color image workstation is provided having a color computer and a video monitor. The original image and the target image are input into the color computer. A plurality of color samples are picked at points on the target image by use of the video monitor. By a statistical analysis, the representative color of the target image is obtained. A plurality of color samples are also picked at points on the original image by use of the video monitor. By a statistical analysis, a representative color of the original image is obtained. By use of the representative color of the original image and the representative color of the target image, image points of the original image are transformed to the transformed image. Preferably, the transforming step is based on the color variation of the original image. The color variation of the original image is determined by analyzing each image point of the original image to determine its distance or spacing in a color space from the representative color in the original image and then using this distance as an additional factor in transforming the image points of the original image to the transformed image.

DESCRIPTION OF THE PREFERRED EMBODIMENTS

Figure 1:
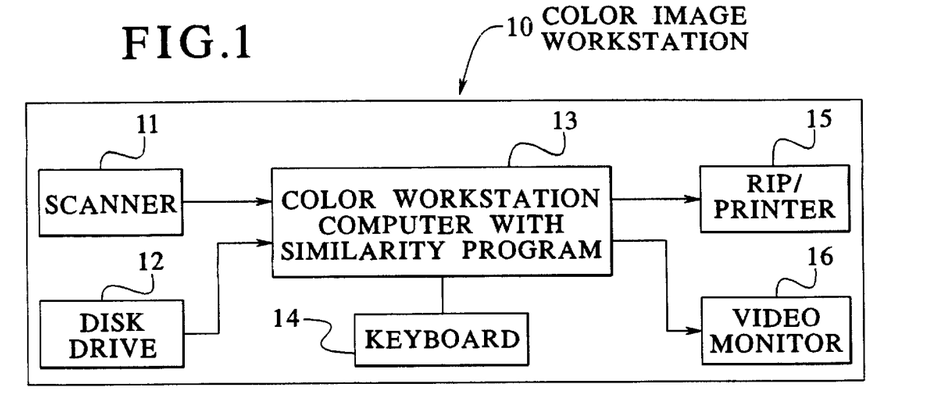
FIG. 1 is a block diagram showing a color image work station employing a similarity program containing similarity algorithms according to the present invention.

A color image workstation according to the invention employing similarity algorithms in a similarity program is generally illustrated at 10 in FIG. 1. As is known in the prior art, color workstations may have color images input to them by a scanner 11 which may scan, for example, color photographs. Alternatively, the color image may be input to the color workstation computer 13 via a floppy disk inserted into a disk drive 12.

Generally, a color workstation with a color computer is known in the prior art and can be, for example, the Linotype-Hell workstations. Such known prior art systems can identify colors on a screen by clicking with a mouse, for example, or by use of a paint brush. In the present invention, however, a similarity program is included which works in conjunction with the known color computer workstation and is thus shown in FIG. 1 at 13 together with the keyboard 14.

Typically as is known in the prior art an RIP/printer combination 15 may be employed to output halftone color screened images for various colors to create a composite color image on a color press, or the color images may be displayed on a video monitor 16.

Figure 2:
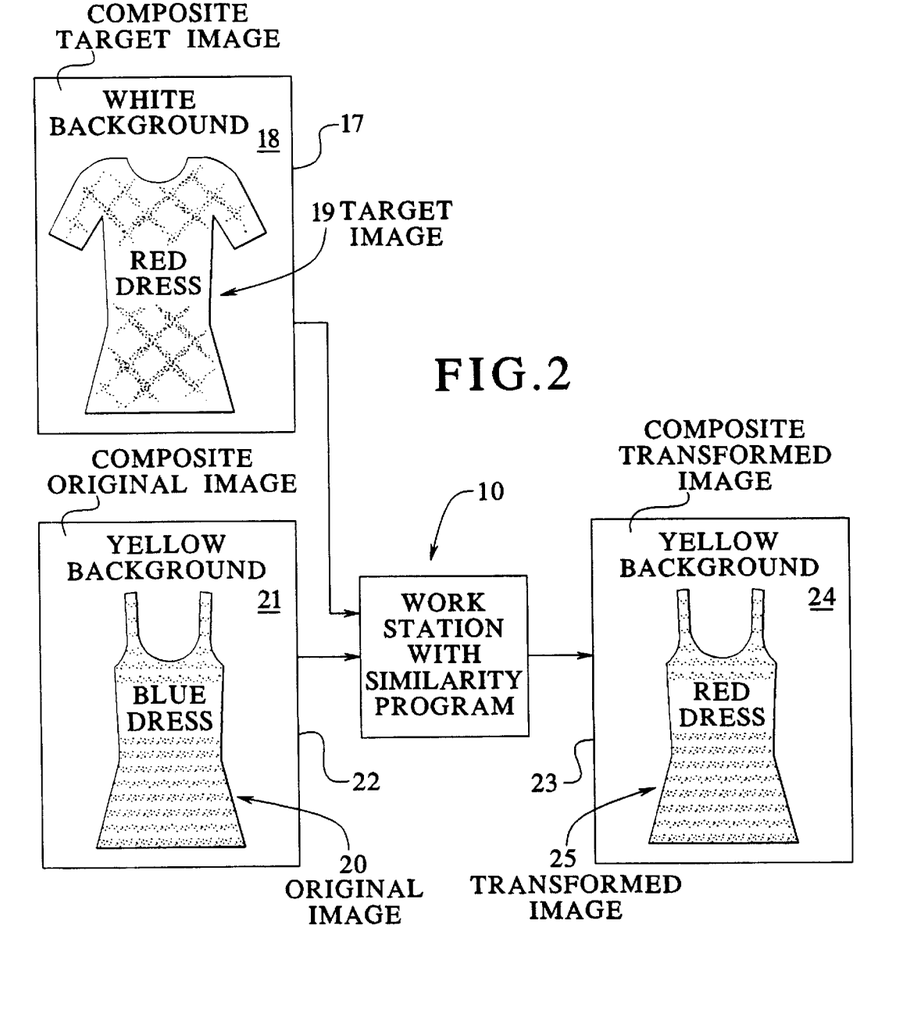
FIG. 2 is a block diagram illustrating the transformation of a composite original image to a composite transformed image according to the invention.

One example of a transformation performed by the present invention may be readily understood by reference to FIG. 2. In FIG. 2, 17 is representative of a composite target image which may, for example, be a photograph having a white background 18 and a target image 19 which, for exemplary purposes, is primarily a red dress of a given style and shape having a pattern of primarily red color variations, as indicated by the stippling pattern. This image may be utilized, for example, in a catalog or the like.

Frequently, it may be desirable in the desktop publishing environment to provide in the same catalog, for example, another dress of a different style and shape shown at 20 as an original image which is primarily blue on, for example, a yellow background 21, representing a composite original image 22 which may be a photograph. The blue dress has a different pattern of primarily blue variations, as indicated by the different stippling pattern. It is desired by the user to change the color of the blue dress to a color scheme similar to the red dress. It is of course understood that in this example when the term "red" dress is employed, that red is a variation of colors of different hue, saturation, and luminance (HSL). Similarly, the blue dress is not all "blue" but is intended to indicate a dress which is generally colored blue but which has variations in blue where hue, saturation, and luminance (HSL) change at various portions of the dress.

With the invention, it is desired to convert the blue dress to the red dress but to utilize the color variations on the blue dress as a primary guide in creating the new colors in the blue dress based on a representative average color (preferably an average) of the red color variations in the red dress. This will be explained in more detail hereafter.

The workstation 10 with the similarity program according to the invention transforms the composite original image 22 into a composite transformed image 23 which may, for example, be output on the video monitor 16. The composite transformed image 23 still has a yellow background 24 similar to the yellow background in the composite original image 22 and also has the transformed image 25 of the same dress style as the original image 20 but which now has variations in the color red based on the representative (average) red color in the target image 19 and also based on the color variations of blue of the original image 20 as explained in more detail hereafter. Thus, although the color has changed in the primarily blue dress, to primarily red, the variations in the red color in the transformed image is based on the pattern of color variation in the original image blue dress, but with the red color being based on the representative (average) red color in the red dress of the target image 19. Thus, the stippling pattern shown in the transformed image 25 is essentially the same stippling pattern as shown by stippling in the original image 20 (however it is not necessarily identical as explained hereafter in connection with FIG. 5).

FIGS. 3A–3F illustrate steps A–F performed in the color workstation of the invention to perform the aforementioned color transformation, using, as an example, an HSL transformation which results in the moving of the image in a CMYK color space, as explained with the equations hereafter.

In Step A (FIG. 3A), as is known in the art a mouse in combination with a cursor on the video monitor can be employed to pick off color samples from a plurality of locations shown by Xs at 26 from the target image 19 of the composite target image 17 having the white background 18. The color samples which are picked off are selected, for example, by an operator who selects points on the red dress having different red color variations on the primary color red—that is different H, S, L values. These values are then stored.

It should be understood that although the color samples are picked off with a color picker, it is also possible, of course as is well known to those skilled in this art that a paint brush could be used to paint across portions of the red dress target image to pick off a plurality of color sample values. The color sample values could also be determined by a mathematical approach.

In Step B (FIG. 3B), a statistical analysis portion of the similarity program of the invention indicated at 27 operates on the HSL target image color sample values to create a target image representative color (such as an average color) represented by $H_s$ $S_s$ $L_s$. It should be understood however, that the broadest form of this invention envisions the use of any representative value, no matter how obtained. For example, instead of average, the representative value could be a median value, or any other type of value determined statistically or mathematically provide to provide a representative color of the color variations in the target image. Of course, the same is true for the representative color for the original image as explained hereafter.

In Step C (FIG. 3C), the color picker (or brush) selects a plurality of color sample values 27 shown by X's on the original image 20 of the composite original image 22. These sample values are stored.

In Step D (FIG. 3D), a statistical analysis is performed on the original image color value samples to obtain average $H_s$ $S_s$ $L_s$ values representing an original image representative color (average color, for example) of the original image. The representative color can be obtained in many different ways as explained previously. This analysis is performed by the statistical analysis portion 27 of the similarity program as described in FIG. 3B.

In Step E (FIG. 3E), preferably according to one embodiment of the invention a filtering of the composite original image 22 is performed to eliminate undesired color values 28 in the composite original image 22 background portion 21 which are similar to color values in the original image 20. This is performed with a filtering portion of the similarity program. What can frequently occur in a background are isolated color values which are not intended to be part of the background, that are not part of the yellow background in this case, but which may occur because of the photographic process, the computer techniques involved, or the like. Thus, such isolated blue color values 28 may occur having color values similar to the blue dress 20. The filtering eliminates these isolated blue color values so that when the transformation Step F) described hereafter is performed, the transformation is not performed on these isolated blue color values in the background so that the yellow background 21 will remain unchanged in the transformation and only the color of the blue dress 20 will change.

Figure 3A:
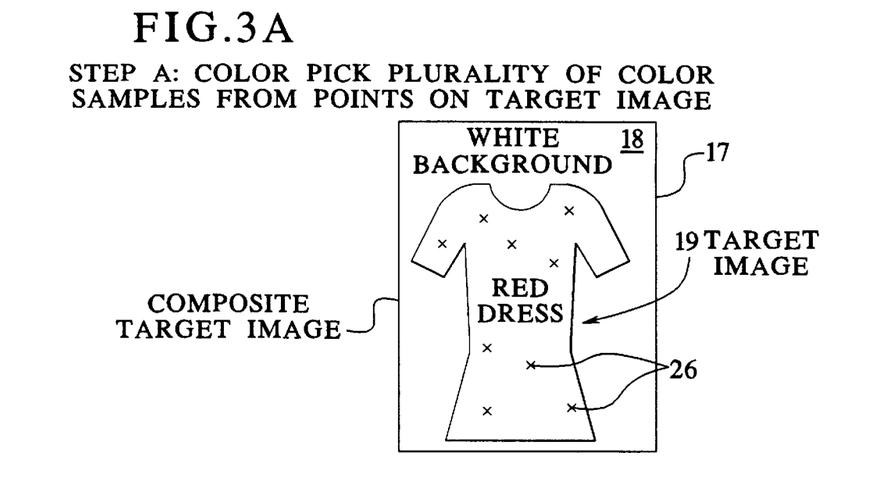
FIGS. 3A–3F illustrate steps performed according to the invention in transforming a composite original image to a composite transformed image having modified colors according to colors appearing in a target image.
Figure 3B:
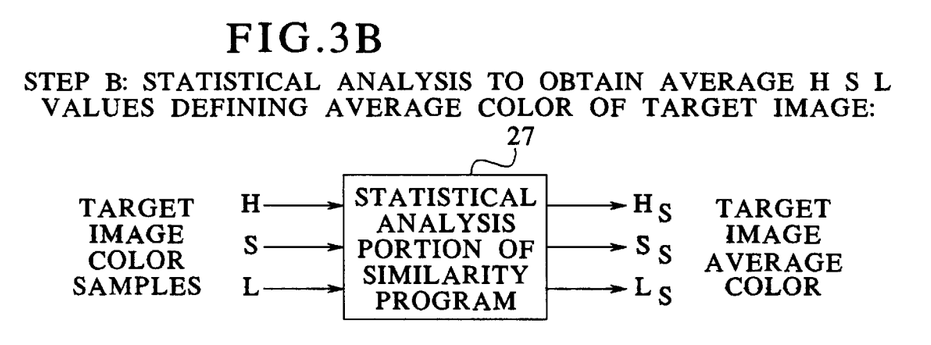
Figure 3C:
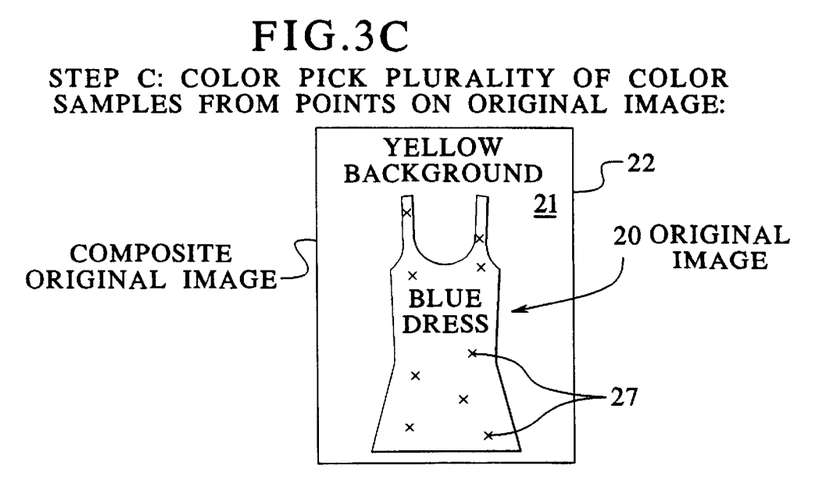
Figure 3D:
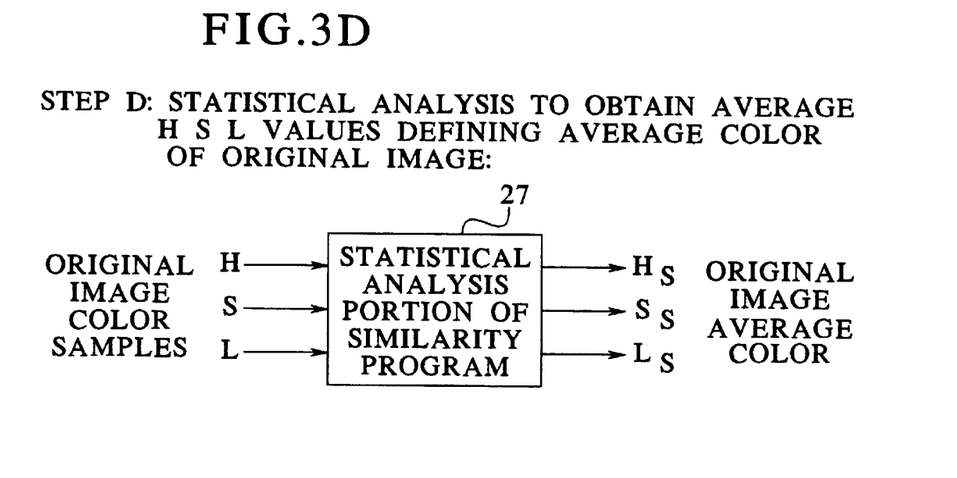
Figure 3E:
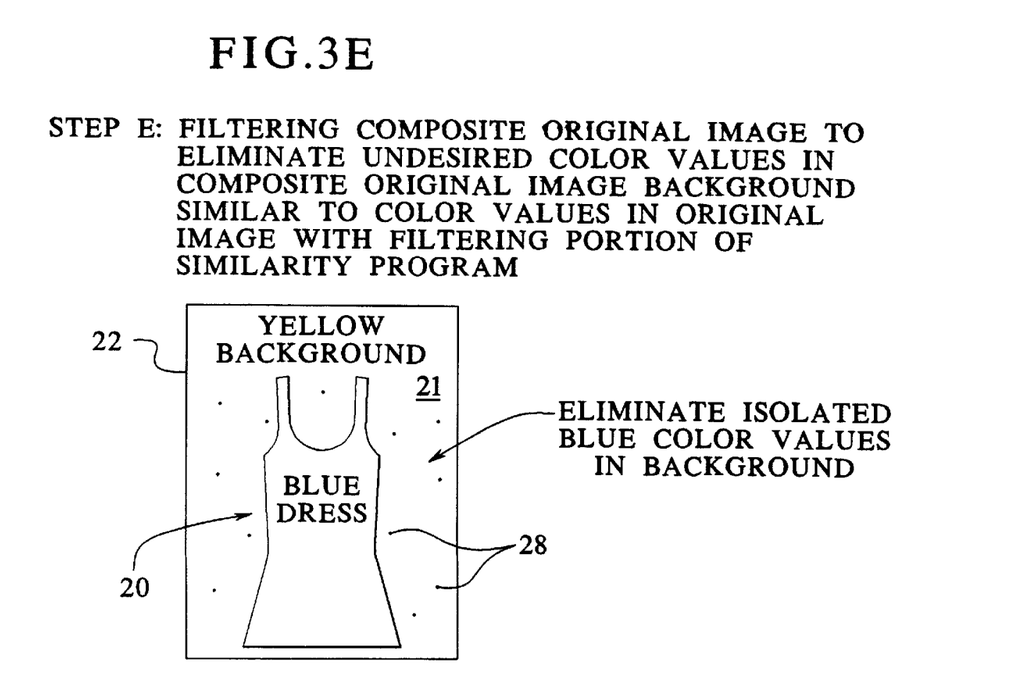

The filtering portion of the similarity program is able to detect the isolated blue color values since they occur in such widely spaced fashion in the yellow background as opposed to the blue color values in the blue dress occurring in very closely spaced fashion. Thus, the algorithm in the program detects this wide spacing and is able to eliminate these blue color values in the background. Such an algorithm elimination procedure is well known in the prior art, such as low pass filtering.

In Step F (FIG. 3F), each point on the filtered composite original image is transformed to create a composite transformed image 23 previously discussed in connection with FIG. 2. This occurs by use of the transformation portion 29 of the similarity program. This occurs for each image point via one of two sub-steps. In sub-step 1 it is determined whether or not the composite original image HSL values are substantially equal to the representative (average) original image color represented by the values $H_s$ $S_s$ $L_s$. If this is the case, then transformation portion 29 changes the H, S, and L values of that particular image point of the original image to $H_{after}$ $S_{after}$ and $L_{after}$ which are equal to the representative values $H_s S_s L_s$ of the target image 19 of the composite target image 17 (the red dress).

Figure 3F:
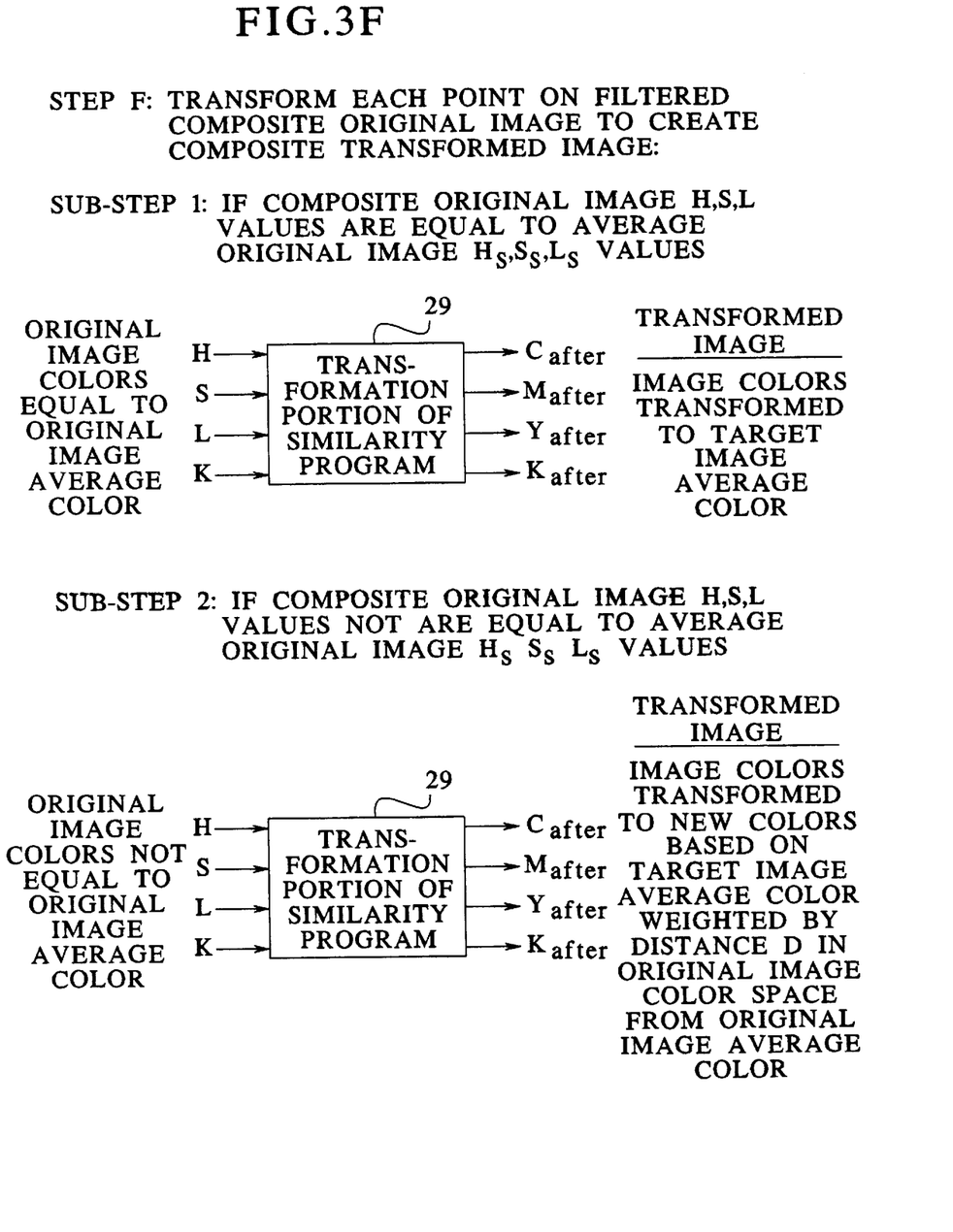

Alternatively, as shown in sub-step 2, if the composite original image HSL values are not equal to the representative original image HSL values, then the transformation portion 29 of the similarity program creates values $H_{after}$ $S_{after}$ and $L_{after}$ of the transformed image representing new colors which are based on the target image representative color $H_s$ $S_s$ $L_s$ weighted by the distance that each respective current image point color being transformed lies from the original image representative color in the original image color space. This concept is explained in more detail in FIGS. 4 and 5.

Figure 4:
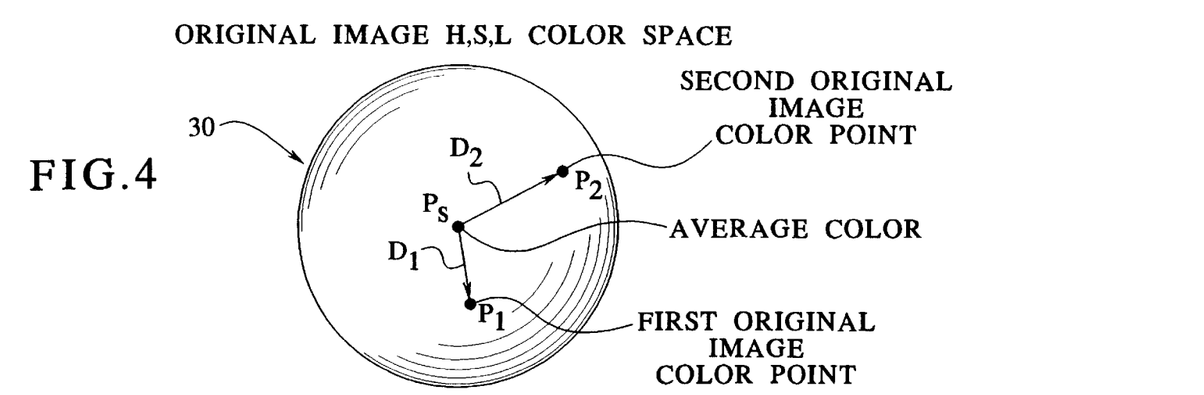
FIG. 4 is a color space illustration for use in explaining the transformation portion of the similarity program for sub-step 2 in FIG. 3F.

In FIG. 4, the original image color space in the exemplary FIG. 3 is HSL coordinates can be contained in some three-dimensional sphere at 30. Two image points being transformed are shown at P1 and P2. The representative (average) color is indicated at $P_s$ The first original image color point P1 lies at a distance D1 within the color space 30 from $P_s$ and the second original image color point P2 lies at a distance D2 from the representative color $P_s$ of the original image. According to the algorithm employed in the similarity transformation portion of the program, the amount of the color change of the current image point being transformed is an arbitrary function of the distance of this current image point from the representative (average) color of the original image. In other words, for the red average color of the red dress of the target image 19, if the original image color point color lies directly at $P_s$ in the original image CMYK color space 30, then that color image point will receive in the transformation the representative color red of the target image 19. The further away that the point lies from $P_s$ of the original image 20, the less the transformed image color will change towards the representative color red, for example.

Of course color is represented by the parameters HSL. Of course, a CMYK color space could also be used and it is understood in this application that wherever HSL is described that alternatively a CMYK color space system (or any other color space system, such as Lab, for example) could be employed throughout the method steps of the invention.

Figure 5:
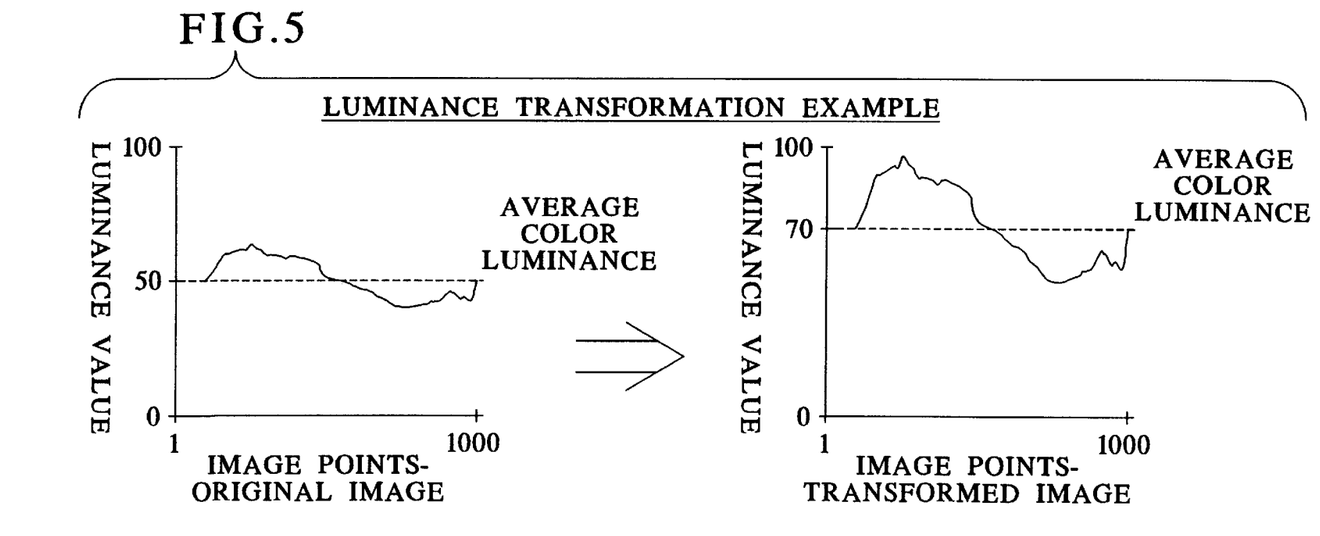
FIG. 5 are graphs illustrating luminance transformation in substep 2 in FIG. 3F when creating the composite transformed image.

In FIG. 5, the transformation is indicated for the luminance parameter L as an example. Of course, the same example would apply either for a hue H or for saturation S in analogous fashion.

As shown at FIG. 5 for luminance transformation, in the left-hand graph on the abscissa the image points of the original image have, for example, 1000 points running from 1–1000 as indicated. Luminance values from 0–100 are shown on the ordinate axis. Each image point has a particular luminance value indicated by the curve shape. Average color luminance is shown at 50. In the composite transformed image, the luminance relationship or curve (also known as function) is centered about the average color luminance for the average color red in the target image but the general shape of the curve still follows that for the luminance curve of the original image, although the amplitude of that curve may well change since the luminance change of the color red for the red dress of the target image 19 may have a greater variation than the luminance change for the color blue in the blue dress. Thus, the total luminance range in the target image is also taken into account in making the transformation. Again, an analogous explanation could be given for hue and for saturation.

Now that the basic operation method steps of the similarity algorithms used in the similarity transformation portion of the similarity program have been described, a detailed explanation will be given in the form of mathematical equations for the similarity algorithms which are employed in the invention. The following equations describe the case of the similarity algorithms being executed such that the selected colors in the original and target images, amount of changes calculated by the similarity algorithms applied to each point of the image, and the original image colors are expressed in terms of HSL, but transformed colors are calculated and stored in a CMYK color space. One skilled in the art, in using these similarity algorithms, can easily write the similarity program depending on the particular programming language desired. Drawing FIGS. 6–9 aid in the explanation and understanding of the similarity algorithms described hereafter.

The CMYK image "after" (transformed image—See Step 3F) is described by the following equations:

$$C_{after} = \sqrt{\frac{2}{3}} \cos(H_{after}) S_{after} + C_{g,after}$$

$$M_{after} = \sqrt{\frac{2}{3}} \cos\left(H_{after} - \frac{2\pi}{3}\right) S_{after} + Y_{g,after}$$

$$Y_{after} = \sqrt{\frac{2}{3}} \cos\left(H_{after} + \frac{2\pi}{3}\right) S_{after} + Y_{g,after}$$

$$K_{after} = (K + \Delta K)_{clamp0 - K_{max}}$$

where:

$C_{g.after} = f_{C_g}(L_{after})$
$Y_{g.after} = f_{Y_g}(L_{after})$ where . . .

$S_{after} = (S + \rho \Delta S)_{clamp0 - S_{max}}$
$L_{after} = (L + \rho \Delta L)_{clamp0 - L_{max}}$
$H_{after} = H + \rho \Delta H - 360$—for $H + \Delta H > 360$
$H_{after} = H + \rho \Delta H + 360$—for $H + \Delta H < 0$
$H_{after} = H + \rho \Delta H$—if not above where:

$\Delta S = f(S_s, S, a_s)$
$\Delta L = f(L_s, L, a_L)$
$\Delta K = f(K_s, K, a_K)$
$\Delta H = f(H_s; H, a_H)$ where:

$$\rho = 1 - \frac{r}{r_{max}}$$

where:

$(CMYK)_{after}$
$(SLH)_{after}$ } - color components after similarity change $CMYK$
$SLH$ } - original color components $(SLHK)_s$—selected image components
$a_{(SLHK)>0}$—similarity change ranges $0 \leq r \leq r_{max}$—color distance expressed in HSL color space $C_{g.after}$ and $Y_{g.after}$—arbitrary functions of luminance based on a gray line location for different "ink sets"

Figure 6:
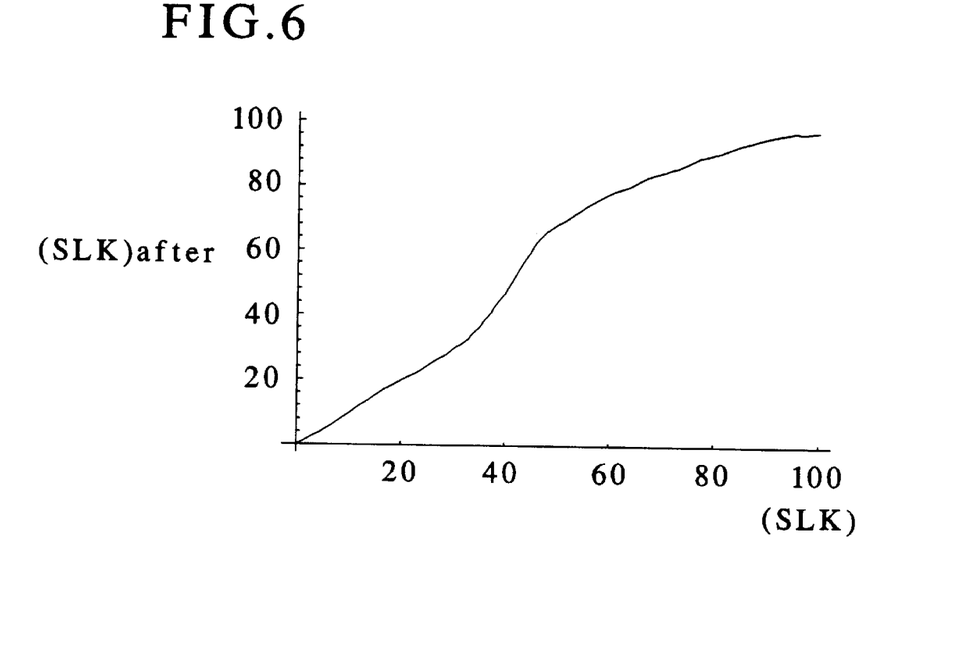
FIGS. 6–9 are graphs for explaining the similarity algorithms employed in the similarity program utilized in the system and method of the invention for transforming an original image into a transformed image having transformed colors based on colors in the target image and also on color variations in the original image.

FIG. 6 shows in a graph the positive change for saturation, diagonal or black.

Figure 7:
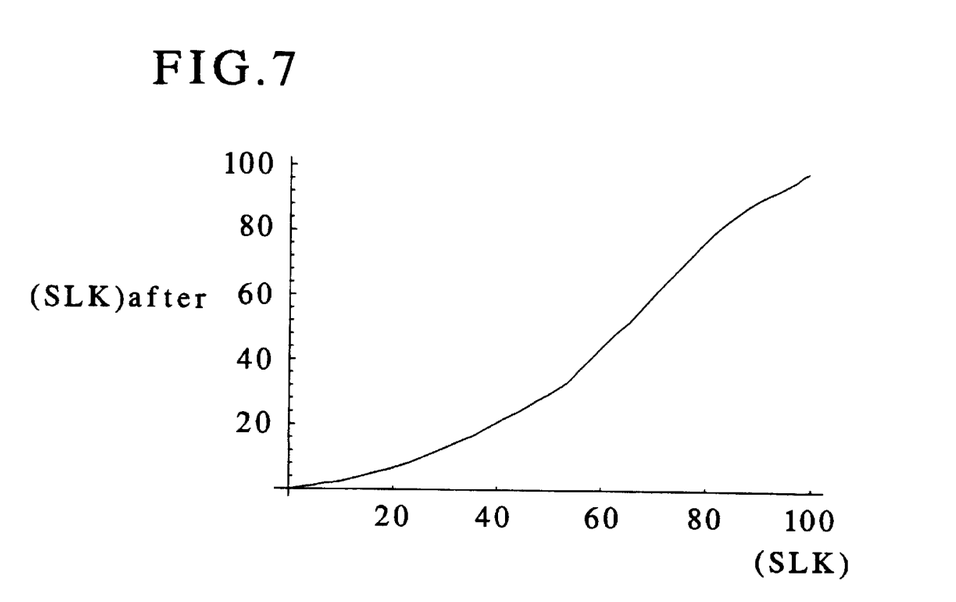

FIG. 7 shows in a graph negative change for saturation, diagonal or black.

Figure 8:
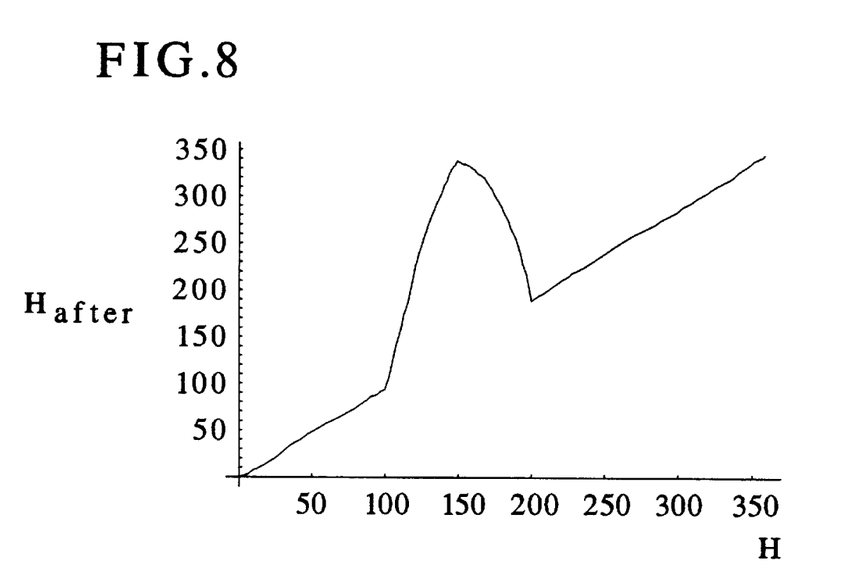

FIG. 8 shows in a graph positive change for hue.

Figure 9:
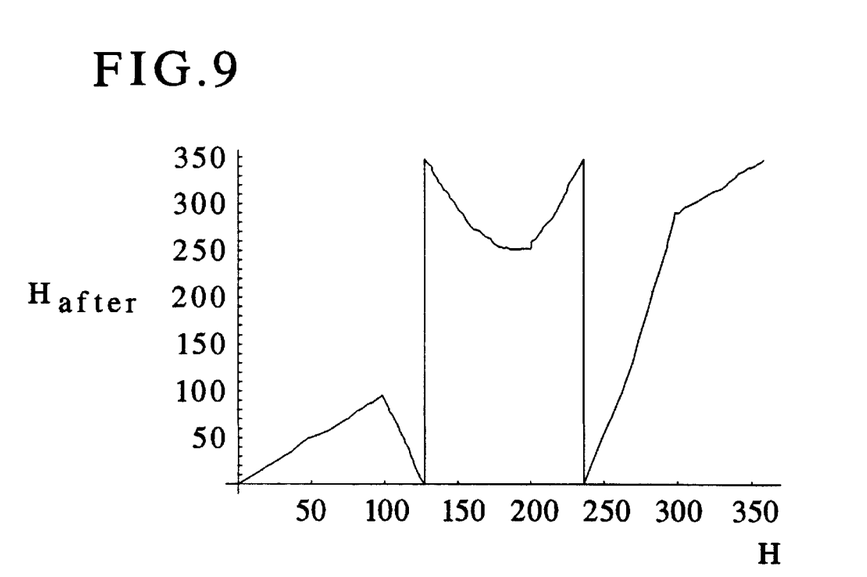

FIG. 9 shows in a graph negative change for hue.

color radius should be calculated from the filtered (smoothing) image in order to eliminate so called "accidental pixels" in the background.

In addition to calculating and applying the transformation to achieve the best match between target image and the image to be transformed the correction can be applied to a certain degree only, or can be applied to over-correct the original according to the operator's subjective impression. Such an over-correction can be achieved, for example, by changing the value $\rho$ in the equations.

Also, certain areas of the original image described by a geometrical mask (including "hard" masks defined by unchanging values and "soft" masks having changeable values) can be excluded from the transformation.

Instead of having the original image in an HSL color space, one can have the original image in the CMYK color space and to pre-calculate or calculate on the fly its HSL representation.

Although various minor changes and modifications might be proposed by those skilled in the art, it will be understood that my wish is to include within the claims of the patent warranted hereon all such changes and modifications as reasonably come within my contribution to the art.

What is claimed is:

1. A method for color transformation of a color variation in an original image into a new color variation in a transformed image of the original image based on a representative color in a target image, comprising the steps of:

providing a color image workstation having a color computer and a video monitor;

inputting the original image and the target image into the color computer;

obtaining a representative color of the target image;

picking a plurality of color samples at points on the original image by use of the video monitor;

by a statistical analysis obtaining a representative color of the original image and by comparing the color samples of the original image to the representative color of the original image, determining color variations; and by use of the representative color of the original image, the representative color of the target image, and the color variations of the original image, transforming image points of the original image to the transformed image.

2. The method according to claim 1 wherein a background at least partially surrounds the respective original image so as to form a composite image.

3. The method according to claim 2 including the step of performing a filtering to eliminate undesired colors in the composite original image background which are similar to colors in the original image.

4. The method according to claim 3 wherein the filtering step employs a wider spacing of the undesired colors in the background as compared to a close spacing of the colors in the original image to identify the undesired colors in the background which are eliminated.

5. The method according to claim 3 wherein the filtering step occurs prior to the transformation step.

6. The method according to claim 1 wherein the transforming step results in the transformed image having new colors substantially centered about the representative color of the target image.

7. The method according to claim 1 wherein the transformed image has colors varying about the representative color of the target image based on the variations of the colors in the original image from the original image representative color.

8. The method according to claim 1 wherein the variation of the color in the transformed image for each image point is based on a distance in a color space of the colors of each respective image point in the original image from the original image representative color.

9. The method according to claim 1 wherein the transformation step involves a check to determine whether the color of each point in the original image is substantially equal to the representative color in the original image, and if it is substantially equal, then the color for the respective point in the transformed image becomes the representative color of the target image, and if the original image color of each point being transformed differs from the representative color of the original image, then the transformation is based on the target image representative color weighted by a distance that the original image color lies from the original image representative color in the original image color space.

10. The method according to claim 1 including the step of picking a plurality of color samples at points on the target image by use of the video monitor, and by a statistical analysis, obtaining said representative color of the target image.

11. The method according to claim 1 wherein the representative colors of the original and target images are average colors.

12. A system for color transformation of a color variation in an original image into a new color variation in a transformed image of the original image based on a representative color in a target image, comprising:

a color image workstation having a color computer and a video monitor;

a storage in the color computer for receiving the original image;

the color computer having a program for obtaining a representative color of the target image;

the color computer picking a plurality of color samples at points on the original image by use of the video monitor;

the color computer having a program for conducting an analysis to obtain a representative color of the original image; and the color computer having a program for using the representative color of the original image, the representative color of the target image, and color variations of the original image to transform image points of the original image to the transformed image.

13. The system according to claim 12 including the provision of a unit for performing a filtering on a background of the original image to eliminate colors in the background which are similar to colors in the original image.

* * * * *